United States Patent [19]

Ng

[11] Patent Number: 5,508,871
[45] Date of Patent: Apr. 16, 1996

[54] CONTINUOUS AUDIO AND VIDEO TAPE

[76] Inventor: Tat O. Ng, 6A Waller St., Onehunga Auckland, New Zealand

[21] Appl. No.: 297,054

[22] Filed: Aug. 29, 1994

[30] Foreign Application Priority Data

Aug. 30, 1993 [NZ] New Zealand ............. 248539

[51] Int. Cl.⁶ ................................. G11B 23/06
[52] U.S. Cl. ............ 360/132; 242/326.4; 226/194
[58] Field of Search ................. 360/132; 242/326, 242/326.1, 326.2, 326.3, 326.4; 226/194, 196

[56] References Cited

U.S. PATENT DOCUMENTS

| | | | |
|---|---|---|---|
| 3,088,687 | 5/1963 | Martin | 242/326.3 |
| 3,176,580 | 4/1965 | Metz | 360/132 X |
| 3,666,192 | 5/1972 | Ito et al. | 242/326.2 |
| 3,706,422 | 12/1972 | Ito et al. | 242/326.2 |
| 4,454,976 | 6/1984 | Saito | 242/326.2 |
| 4,462,553 | 7/1984 | Hashimoto | 242/326.3 |

FOREIGN PATENT DOCUMENTS

| | | | |
|---|---|---|---|
| 2324655 | 11/1973 | Germany | 360/132 |
| 3242016 | 5/1983 | Germany | 360/132 |
| 56-11667 | 2/1981 | Japan | 360/132 |
| 59-28277 | 2/1984 | Japan | 242/326 |
| 59-124040 | 7/1984 | Japan | 360/132 |

OTHER PUBLICATIONS

IBM TDB vol. 13, No. 11 Apr. 1971 "Reversible Endless Tape Cassette", Owen, p. 3324.
IBM TDB vol. 15 No. 9 Feb. 1973 "Loose Tape—Tight Tape Cartridge", Flippen et al, pp. 2711–2712.

Primary Examiner—Stewart S. Levy
Assistant Examiner—William J. Klimowicz

[57] ABSTRACT

A continuous magnetic tape cassette for use in a magnetic tape recording and/or reproducing apparatus. The cassette comprises a casing for housing a magnetic tape, which has two ends connected together continuously forming one endless loop. A hub is rotatably mounted within the casing for rotationally engaging a driving shaft. A conveyor assembly is frictionally coupled to the hub, for imparting motion to the magnetic tape. The conveyor assembly comprises a plurality of guide rollers rotatably disposed about an outer circumference of the hub and an endless belt entrained about the plurality of guide rollers for frictionally coupling a rotation of the hub to the magnetic tape. A lever arm assembly is coaxially disposed about the hub and is connected to the endless belt which imparts the motion to the lever arm assembly. The lever arm assembly comprises a lever arm and a plurality of lever arm pinch rollers rotatably disposed on a distal end of the lever arm for guiding the magnetic tape about the hub. The magnetic tape is coiled circumferentially about the hub, with the coiled magnetic tape remaining substantially within a plane parallel to the hub.

1 Claim, 4 Drawing Sheets

CONTINUOUS AUDIO AND VIDEO TAPE

BACKGROUND OF THE INVENTION

1. Field of the Invention

The present invention relates to a continuous magnetic tape, comprising a magnetic tape of which both ends are connected together to form a continuous loop. The magnetic tape is arranged in different configuration by various mechanisms. The magnetic tape can be of various lengths providing recording time from a few seconds to a number of minutes according to its purposes.

2. Discussion of the Prior Art

FIG. 1 is a plane view partly cross-sectioned of a conventional endless audio magnetic cassette tape which has been widely used in answering phone machines. Wherein a reference numeral 1 designates a magnetic tape of which both ends are connected together to form a continuous loop.. Numeral 2 designates a casing. Letter T designates a magnetic tape reel. Numerals 22 and 32 designate two holes for the driving shafts of the recording apparatus. Letter E designates a hub disposed in casing 2. When this audio endless cassette tape is mounted on a recording apparatus to play, two guide posts formed in the recording apparatus are inserted in reference holes 6, an erase head moves into the window 5, a recording/playing head moves into window 7, and the two driving shafts of the recording apparatus are inserted into the holes 22 and 32. The rotation of the driving shafts does not affect the inside mechanism of the tape. Further, a capstan shaft of the recording apparatus is fitted to the aperture 8, and a pinch roller pushes the magnetic tape 1 against the capstan shaft through the window 9. The rotation of the capstan shaft and pinch roller pulls the magnetic tape 1 from the guide roller 4 to guide roller 10 under the condition that the magnetic tape 1 is held by the pinch roller and the capstan shaft. The magnetic tape 1 is wound loosely around the hub E to form a reel T, so loosely that it can be pulled out from the center of the reel T, feeding askew, so that it passes across the reel T. As the magnetic tape 1 is transported past the recording/playing head by the action of the capstan and pinch roller, it continues to pull from the center of the reel T, rotating the reel T as it does so. The magnetic tape is fed back onto the outside of the reel T, providing its own take up. The magnetic tape is continuous. When the magnetic tape runs in contact with the recording/playing head of the recording apparatus, an electromotive force is reproduced in the coil of the recording/playing head. An output for reproducing the message is obtainable.

The magnetic tape should not fit tightly, but neither should it be loose. On the other hand, if pulling the magnetic tape 1 from the center of the reel T causes the magnetic tape 1 being fed back onto the outside too tighten, the magnetic tape 1 will jam. The edge of the magnetic tape 1 is easily damaged by friction which is taken place, while the magnetic tape 1 is pulled out from the center of the reel T. The magnetic tape 1 handling must be carefully controlled, even a slight buckling of the tape fed to the outside of the reel T will increase the diameter of the outside turn. The reel T will start taking up the slack faster than it is drawing tape from the center of the reel T. As this continues, more of the reel T will have a larger turn size than original until again the magnetic tape 1 jams. This cassette tape can not be used either side up.

FIG. 2 is a plane view partly cross-sectioned of a video magnetic cassette tape which has been widely used. Reference numeral 51 designates a magnetic tape. Numeral 52 designates a casing. Numeral 91 designates a window for capstan shaft and pinch roller of the recording apparatus. Numeral 53 designates a take up guide roller formed in casing 52. Numeral 92 designates a take up guide formed in casing 52. Numeral 85 designates a supply guide roller. Numerals 55 and 75 designate two drums respectively, which are disposed in the casing 52. Numerals 54 and 74 designate two center pieces of the two drums 55 and 75. Letter G designates the supply reel.

When this video magnetic cassette tape is inserted into a video recording apparatus to play, two driving shafts of the video recording apparatus will be inserted into the two center places 54 and 74 of the two drums 55 and 75 respectively; the two center places 55 and 74 have little pins projecting inwards. These pins engage with the projections on the driving shafts. Thus a rotational force is applied to drum 55, which rotates clockwise. The magnetic tape is wound onto the take-up drum 55 under tension. Furthermore, a capstan shaft of the video recording apparatus is fitted to the window 91, and a pinch roller pushes the magnetic tape 51 against the capstan shaft through window 91. The rotation of the capstan shaft and the pinch roller pulls the magnetic tape 51 through the tape path from the supply guide roller 85 to the take up guide roller 53. The magnetic tape 51 comes off supply reel G, passes over the supply guide roller 85, and runs in contact with the erase head and the video drum which houses the video heads. The magnetic tape 51 is wound onto the drum 55. The signals on magnetic tape 51 are read by video heads and an audio/control head. The ends of the magnetic tape 51 are fastened on the drums 55 and 75, so there must be a limited playing time. When the magnetic, off the supply reel, reaches its end, it has to be rewound to be played again. This video cassette tape can not be used either side up.

SUMMARY OF THE INVENTION

It is an object of the present invention relates to provide a continuous audio or video tape cassette, wherein recording time varies from a few seconds to a number of minutes according to the different purpose, for use with a conventional audio or video recording and/or reproducing apparatus.

It is another object of the present invention to provide a continuous audio or video magnetic tape cassette wherein the pulling part of the magnetic tape may not pass across other turns of the wound magnetic reel, so that it can minimize the damage of the magnetic tape.

It is still an object of the present invention to provide a continuous audio or video magnetic tape cassette wherein the magnetic tape is arranged in a loop-waved or loop-coiled configuration storing within the casing.

This kind of storage of magnetic tape may allow longer magnetic tape storage within the casing, thus the present invention enables the magnetic tape cassette to play at longer times than the conventional endless tape cassettes, wherein the drawing part of the tape is pulled from the center of the tape reel, and the take-up part of the tape is wound on the reel. This conventional structure of the tape would not allow many turns of the tape wound on the reel, because more turns of the tape increases the chance of the magnetic tape jamming.

It is still an object of the present invention to provide a continuous audio or video tape cassette wherein the take-up part of the magnetic tape is drawn by an action of a wheel and a pinch roller, and comes out from a plurality of lever arm pinch rollers, that enable the magnetic tape take-up more smoothly and regularly, while with the conventional endless tape, the take-up part of the magnetic tape is wound on the outer periphery of the magnetic reel. This kind of take-up would easily cause magnetic tape jams.

It is still an object of the present invention to provide a continuous audio or video tape cassette, wherein the left side of devices may be the same as the right side, so that it enables the magnetic tape cassette to be used either side up, while the conventional endless tape cassette is used on one side only.

It is still an object of the present invention to provide a continuous audio or video tape cassette wherein the magnetic tape may be stored in more rooms of the casing, whereby the magnetic tape may be stored in both sides of the casing, while the conventional endless tape cassette can be stored in one side only.

It is still an object of the present invention to provide a continuous audio or video tape cassette whereby it may be used continuously without stopping or rewinding.

To accomplish the above described objects respectively, the present invention is characterized by a casing for housing a magnetic tape. The magnetic tape has two ends connected together continuously forming one endless loop. At lease one hub is rotatably mounted within the casing for rotationally engaging a driving shaft of the recording and/or reproducing apparatus, at least one conveyor assembly, fictionally coupled to a hub, for imparting motion to the magnetic tape housed within the casing, wherein the conveyor assembly further comprises a plurality of guide rollers rotatably disposed about an outer circumference of the hub and an endless belt entrained about the plurality of guide rollers for frictionally coupling a rotation of the hub to the magnetic tape; at least one lever arm assembly coaxially disposed about the hub and connected to the endless belt of the conveyor assembly, whereby motion of the endless belt imparts circumferential motion to the lever arm assembly. The lever arm assembly comprises a lever arm, wherein the lever arm includes a plurality of lever arm pinch rollers rotatably disposed on a distal end of the lever arm for guiding the magnetic tape about the hub. A plurality of stop pins are mounted within the casing adjacent the hub for limiting the circumferential travel of the lever arm, wherein when the hub engages the driving shaft of the recording and/or reproducing apparatus. A rotational force of the driving shaft is transmitted to the hub and the endless belt of the conveyor assembly thus imparting motion to the magnetic tape frictionally coupled thereto with the magnetic tape being coiled circumferentially to the endless belt such that the coiled magnetic tape remains substantially within a plane parallel to the hub.

REFERRING TO THE DRAWINGS

Figure 1:
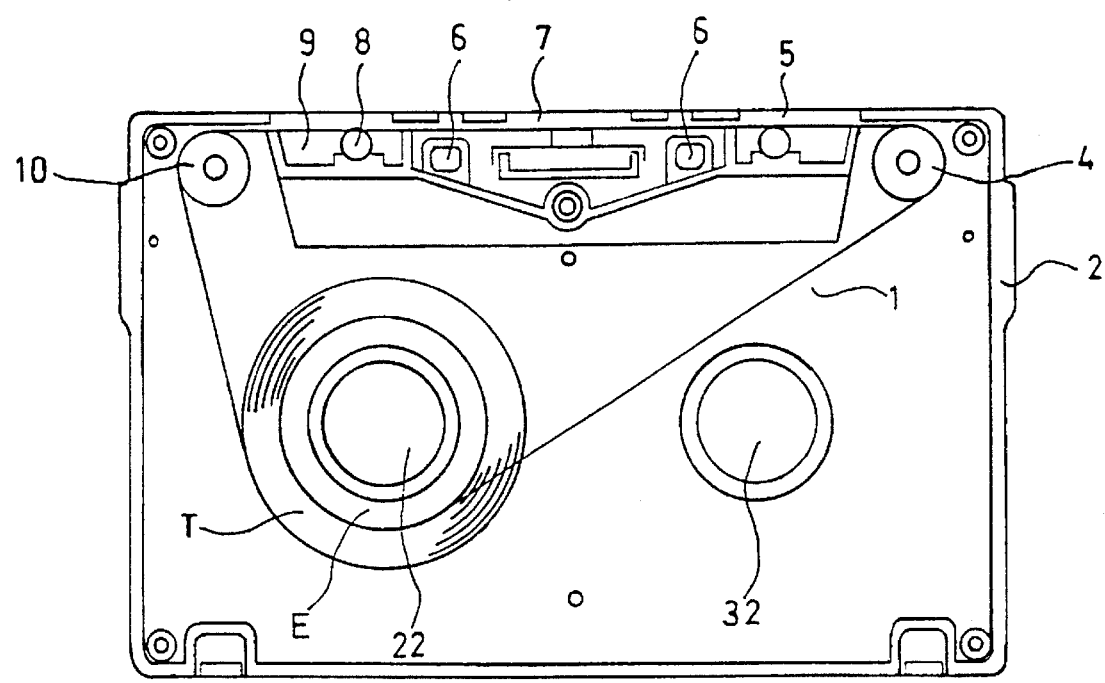
FIG. 1 is a plane view partly cross-sectioned of a conventional endless audio magnetic cassette tape.
Figure 2:
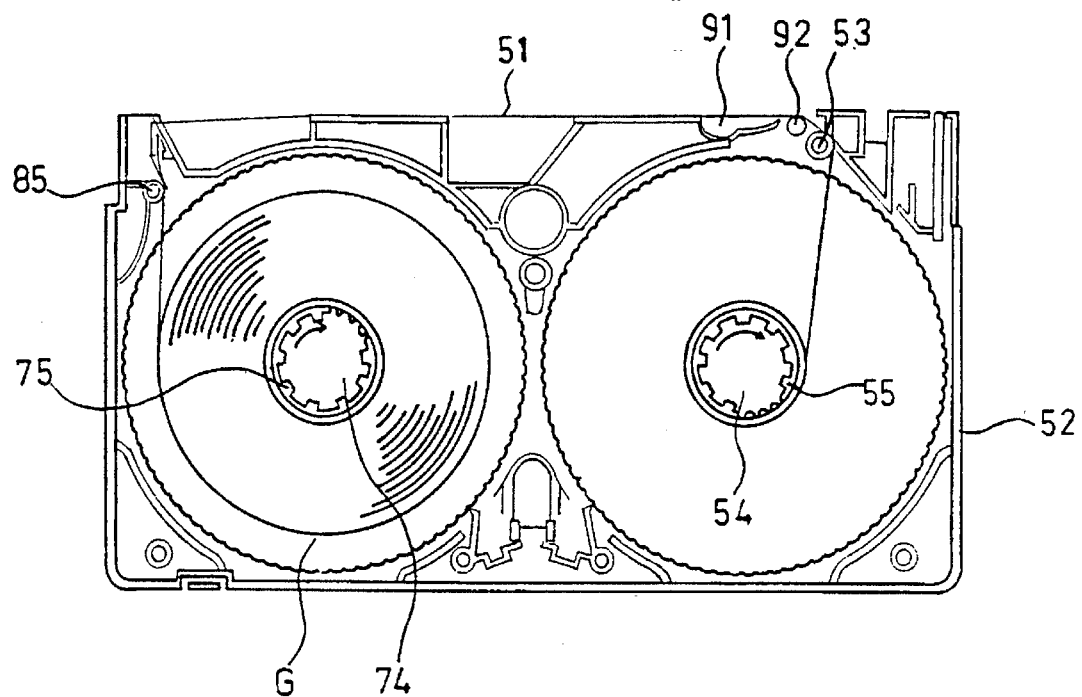
FIG. 2 is a plane view partly cross-sectioned of a conventional video magnetic cassette tape.
Figure 3:
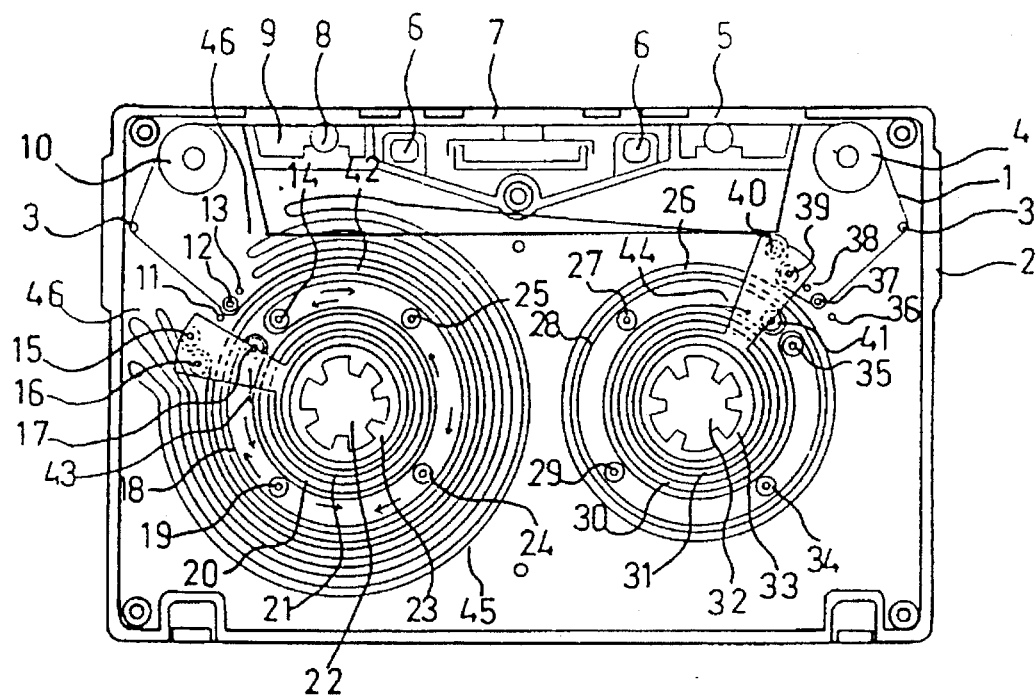
FIG. 3 is a plane view partly cross-sectioned of a continuous audio cassette tape and a first embodiment of my invention.

In FIG. 3 a magnetic tape 1, of which both ends are connected together to form an endless loop, is placed in the casing 2 as is shown in FIG. 3. The two guide pins 3 and the two guide rollers 4 and 10 are formed in the casing 2 to give stable transport of the magnetic tape 1. A rubber ring 20 surrounds the hub 23 which is disposed in the casing 2. The rubber rings provides better frictional contact with the endless belt 18 of the conveyor assembly. The conveyor assembly comprises an endless belt 18 which is entrained about a group of guide rollers 17, 19, 24 25, 14. A lever arm assembly 21 comprises a lever arm, with the lever arm including pinch rollers 15 and 16 disposed on a distal end of the lever arm. The lever arm assembly is disposed coaxially about the hub 23. The lever assembly is further disposed onto the hub 23 in such a way that the protrusion from the hole in the casing 2 supports the lever arm 21 and thus enables the lever arm 21 to rotate freely and coaxially about the hub 23.

When this continuous audio cassette tape is mounted on a recording apparatus to play, two guide posts formed in the recording apparatus are inserted in the reference holes 6 which are formed in the casing 2. The erase head of the recording apparatus moves forward into the window 5. The recording/playing head of the recording apparatus moves into the window 7. A driving capstan shaft of the recording apparatus is fitted to the aperture 8. A pinch roller of the recording apparatus moves into the window 9 pushing the magnetic tape 1 against the capstan shaft. When the capstan shaft rotates, the assembly of capstan shaft and the pinch roller generate a pulling effect that pulls the magnetic tape 1 from the guide roller 4 to the guide roller 10. Two driving shafts of the recording apparatus are inserted to the center openings 22 and 32 of the hubs 23 and 33 respectively. The center openings 22 and 32 have pins projecting inward; these pins engage with the projections on the two driving shafts. A rotational force is applied to hub 23, which rotates counter-clockwise, while the hub 33 has no rotational force applied to it. As the hub 23 rotates, by virtue of friction, it will move the inner part of the belt 18 of the conveyor assembly with it.

This will cause the belt 18 to move in the direction as indicated in FIG. 3 and the guide rollers 17, 19, 24, 25, 14 will all rotate clockwise. A wheel 42 is in contact with the outer part of the belt 18, which moves the wheel 42 clockwise. A piece of nylon thread 43 is attached to the arm of the lever arm assembly 21 and also to a point on the belt 18. As the belt 18 is moved, the nylon thread 43 enables lever arm of the lever arm assembly 23 to rotate and oscillate to follow the path of the belt 18, i.e., clockwise and counter-clockwise alternatively. A wheel-pinch roller assembly comprises a wheel 42 and a pinch roller 12.

The pinch roller 12 and two stop pins 11 and 13 are formed in casing 2. The pinch roller 12 presses the magnetic tape 1 against the wheel 42. The wheel 42 rotates clockwise, because it is in contact with the outer part of the belt 18, while the pinch roller 12 rotates counter-clockwise. The action of the wheel 42 and the pinch roller 12 generates a pulling effect which pulls the magnetic tape 1 from the guide roller 10, via the left side of guide pin 3, to the outer rim of the wheel 42. The stop pins 11 and 13 will prevent the lever arm from overtravelling. The magnetic tape 1 is pulled along the outer rim of the wheel 42 to the pinch roller assembly which comprises the two pinch rollers 15 and 16. The magnetic tape 1 is sandwiched between two pinch rollers 15 and 16. The pinch roller 16 presses the magnetic tape 1 against the wheel 42. The wheel 42 rotates clockwise causing the pinch roller 16 to rotate counter-clockwise. The action of the pinch rollers 15 and 16 and the wheel 42, pull the magnetic tape 1 from pinch roller 12 along outer rim of the wheel 42, feeding into pinch rollers 15 and 16. The magnetic tape 1 comes out from the assembly of pinch rollers 15 and 16 in such a way that it traces the path in which the lever arm 21 takes, making loops 46 at the places adjacent the stop pins 11 and 13 respectively, where the direction of the lever arm 21 changes. Therefore the magnetic tape 1 moves in such a way that newly fed magnetic tape 1 will always be adjacent to the wheel 42 and moving along the wheel 42. In this manner, the magnetic tape 1 forms a loop-coil or loop-wave around the wheel 42, which gets pushed radially outwards as more magnetic tape 1 is fed into the assembly of pinch rollers 16 and 15. Numeral 45 designates a loop-coil or loop-wave magnetic tape of which another end of the loop goes to the assembly of pinch rollers 40 and 39, which are formed in the lever arm 31 at the end of thereof. The magnetic tape 1 passes between pinch rollers 40 and 39, and between the wheel 26 and the pinch roller 37, then is pulled via right guide pin 3, reaching to the guide roller 4. Here a cycle of movement of the magnetic tape 1 is completed.

The right side of the magnetic tape cassette is constructed as the same with the left side. There is a hub 33 surrounded with a rubber ring 30 which is in contact with a belt 28 of the conveyor assembly comprise a belt 28 and a group of rollers 41, 27, 29, 34, 35. The outer part of the belt 28 is in contact with the inner rim of the wheel 26; a lever arm 31, of the lever arm assembly, is placed concentrically onto the top of the hub 33. The lever arm 31 is placed onto the hub 33 in such a way that the protrusion from the hole in the casing 2 supports the lever arm 31 and thus enables the lever arm 31 to rotate freely and concentrically with the hub 33. A nylon thread 44 is attached to the lever arm 31 and to a point of the belt 28.

When the magnetic tape 1 runs in contact with the recording/playing head, an electromotive force is generated in the coil of the head. Thus, the message recorded on the magnetic tape is reproduced. As the magnetic tape 1 moves continuously, the message will be repeated continuously.

As the right side mechanical structure of this magnetic tape cassette is the same as the left side, it is symmetrical, so it can be used either side up.

Figure 3A:
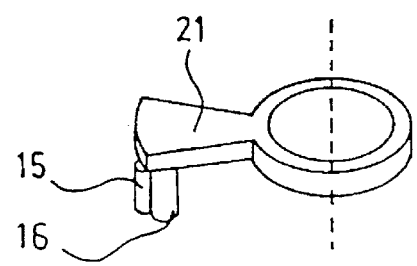
FIG. 3(A) is a perspective view of the lever arm assembly of the continuous audio cassette tape of the first embodiment of my invention.

FIG. 3A shows a perspective view of a lever arm assembly comprising a lever 21 and pinch rollers 15 and 16.

Figure 3B:
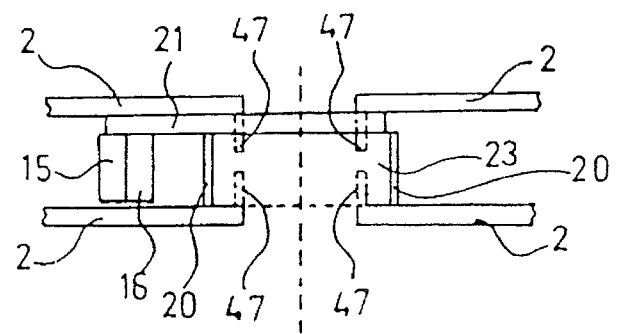
FIG. 3(B) is a cross-section view of the casing, the lever arm assembly, the hub, and the protrusion of the casing of the continuous audio cassette tape of the first embodiment of my invention.

FIG. 3B shows a cross-section view of the casing 2 and lever arm 21, and pinch rollers 15 and 16, a hub 23, rubber ring 20, and the protrusions 47 from the hole of the casing 2. The lever arm 21 is placed concentrically on the top of the hub 23, and is supported by the protrusion 47.

Figure 4:
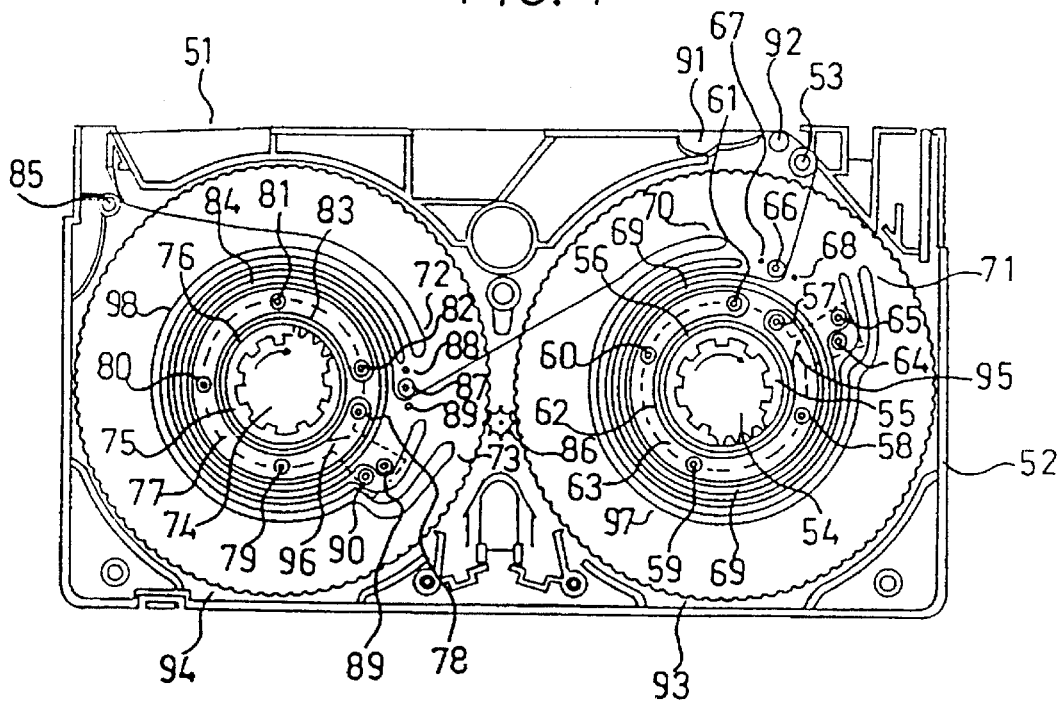
FIG. 4 is a plane view partly cross-sectioned of a continuous video cassette tape and a second embodiment of my invention.

In FIG. 4, a magnetic tape 51, of which both ends are connected together to form a continuous loop, is placed in the casing 52 as FIG. 4 shows. The take-up guide roller 53 and take-up guide pin 92 and supply guide roller 85 are formed in the casing 52 to give stable transport of the magnetic tape 51. A pair of driving drums 55 and 75 are disposed in the casing 52 respectively. The driving drum 55 and toothed wheel 93 are in one unit. The driving drum 75 and the toothed wheel 94 are of unitary structure. Two rubber rings 56 and 76 surround the driving drums 55 and 75 respectively. These rubber rings which could be made by other soft material, provide better frictional contact with the belt 62 and 88 respectively. Two conveyor assemblies comprise respectively, a belt 62 with a group of guide rollers 57, 58, 59, 60, 61, and a belt 83 with a group of guide rollers 78, 79, 80, 81, 82. Two lever arms 63 and 77 are fitted on to the toothed wheels 93 and 94 respectively, concentrically with the driving drums 55 and 75 respectively. FIG. 4B shows the right hand side cross-sectional view of the driving drum 55, lever arm 63, pinch rollers 64 and 65, the toothed wheel 93 and casing 52.

The left hand side mechanical structure is the same as the right hand side. A cog 86, formed in the casing 52, is installed between two toothed wheels 93 and 94 of which the teeth are meshed with the teeth of the cog 86 when this continuous video cassette tape is inserted into the video recording apparatus to play. A driving capstan shaft of the recording apparatus is fitted in window 91. A pinch roller of the recording apparatus moves forward into the window 91 pushing the magnetic tape 51 onto the capstan. When the capstan turns, the action of the capstan and the pinch rollers generates an effect which pulls the magnetic 51 from the supply guide roller 85, passing over the erase head, the video heads and the audio/control head of the recording apparatus. Two driving shafts of the recording apparatus are inserted into the center places 54 and 74, each having teeth projecting inward. These teeth engage with the projections on the two driving shafts. A rotational force is applied to the driving drum 55, enabling it to rotate clockwise. The toothed wheel 93 also rotates clockwise. This rotation action enables the cog 86 to rotate counter-clockwise, with the toothed wheel 94 and the driving drum 75 rotating clockwise, since the teeth of the cog 86 are meshed with the teeth of the two toothed wheels 93 and 94. As the driving drum 55 rotates clockwise, by virtue of friction, it will move the inner part of the belt 62 with it. The belt 62 moves in such manner that the inner part of it moves clockwise and the outer part of it moves counter-clockwise. The guide rollers of conveyor assembly will all rotate counter-clockwise. The conveyor assembly comprises a belt 62 and group of rollers 57, 58, 59, 60, 61. A piece of nylon thread 95 is attached to the lever arm 63 and also to the belt 62. As the belt 62 is moved, the nylon thread 95 which connects the lever arm 63 to the belt 62 enables the lever arm 63 to rotate and oscillate, following the path of motion of the belt 62, that is clockwise and counter-clockwise alternatively. A wheel pinch roller assembly comprises a wheel 69 and a pinch roller 66 with two stop pins 67 and 68 formed in the casing 52. The pinch roller 66 presses the magnetic tape 51 against the wheel 69. The wheel 69 rotates in a counter-clockwise direction, because it is in contact with the outer part of the belt 62, but the pinch roller rotates clockwise. The action of the assembly of pinch roller 66 and the wheel 69 generate a pulling effect, which pulls the magnetic tape 51 from the take up guide roller 53 to the outer rim of the wheel 69. The stop pins 67 and 68 will stop the lever arm 63, so that it will not rotate past those stop pins 67 and 68. Then, the magnetic tape 51 goes along the outer rim of the wheel 69 to the assembly of pinch rollers 64 and 65 which are formed in the lever arm 63 and at the end of it. The magnetic tape 51 is sandwiched between two pinch rollers 64 and 65. The pinch roller 64 presses the magnetic tape 51 against the wheel 69 which rotates counter-clockwise. The magnetic tape 51 is pulled by the pulling effect which is generated by the rotation of the wheel 69 and pinch rollers 64 and 65. The magnetic tape 51 comes out from the assembly of pinch roller 64 and 65 in such a way that it traces the path which the lever arm 63 takes, making loops 70 and 71 at the places adjacent the stop pins 67 and 68 respectively, where the direction of the lever arm 63 changes. Therefore, the magnetic tape 51 moves in such a way that the newly fed magnetic tape 51 will always be adjacent to the wheel 69 and moving along the wheel 69. In this manner, the magnetic tape 51 forms a loop-coil or loop-wave 97 around the wheel 69, which gets pushed radially outward as more magnetic tape 51 is fed into the assembly of the pinch rollers 64 and 65.

A rotational force is applied to the driving drum 75 enabling it to rotate clockwise, because of the teeth of the cog 86 meshing with the teeth of wheel 94. By virtue of friction, as the driving drum 75 is rotated clockwise, it will move the inner part of the belt 88 which is in contact with it. The belt 88 moves in such a manner that the inner part moves clockwise. The guide rollers of the conveyor assembly 78, 79, 80, 81, 82 will all rotate counter-clockwise. A piece of nylon thread 96 is attached to the lever 77 and also to a point on the belt 88. As the belt 88 is moved, the nylon thread 96 which connects the lever arm 57 to the belt 88, enables the lever arm 77 to rotate and oscillate, following the path of motion of the belt 88, that is, clockwise and counter-clockwise alternatively.

A wheel-pinch roller comprises the wheel 84 and the pinch roller 87. The pinch roller 87 and two stop pins 88' and 89 are formed in casing 52. The pinch roller 87 presses the magnetic tape 51 against the wheel 84. The wheel 84 rotates in a counter-clockwise direction because its inner rim is in contact with the outer part of the belt 88, but the pinch roller 87 rotates clockwise. The rotation of the assembly wheel of 84 and pinch roller 37 generates a pulling effect, which pulls the magnetic tape 51 from loop 70 to the outer rim of the wheel 84. Then, the magnetic tape 51 goes along the outer rim of the wheel 84 to the pinch roller assembly comprising the pinch rollers 89 and 90, which are formed in the lever arm 77 and at the end of the lever arm 77. Th pinch roller 90 presses the magnetic tape 51 against the wheel 84, and the magnetic tape 51 is sandwiched between two pinch rollers 89 and 90. When the wheel 84 rotates counter-clockwise, the pinch roller 90 rotates clockwise and the pinch roller 89 rotates counter-clockwise. The magnetic tape 51 is pulled by the pulling effect which is generated by the rotation of the wheel 84, pinch roller 90 and the pinch roller 89. The magnetic tape 51 comes out from the pinch roller assembly of pinch rollers 89 and 90 in such a way that it traces the path which the lever arm 77 takes, making loops 72 and 73 at the places adjacent stop pins 88' and 89 respectively, where the direction of the lever arm 77 changes. Therefore, the magnetic tape 51 moves in such a way that newly fed magnetic tape 51 will always be adjacent to the wheel 84 and moving along the wheel 84. In this manner, the magnetic tape 51 forms a loop-coil or a loop-wave around the wheel 84, which gets pushed radially outward as more magnetic tape 51 is fed into the pinch roller assembly 90 and 89. The stop pins 88' and 89 formed in casing 52 will stop the lever arm 77, so that it will not rotate past stop pins 88' and 89. Then, the magnetic tape 51 will be pulled to the supply guide roller 85.

Here a cycle of movement of the magnetic tape 51 is completed. As the magnetic tape 51 runs in contact with the video heads and audio/control head of the video recording apparatus, an electromotive force generated in the heads. The message recorded on the magnetic tape 51 will be reproduced. As the magnetic tape 51 moves continuously, the message will be repeated continuously.

Figure 4A:
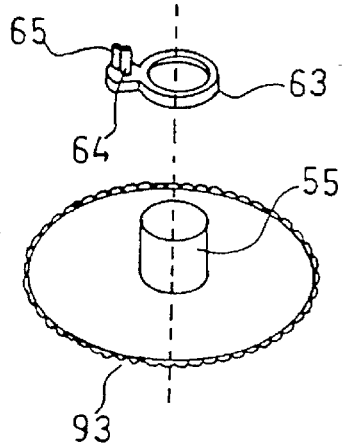
FIG. 4(A) is a perspective view of the lever arm assembly and the toothed-drum of the continuous video cassette tape of the second embodiment of my invention.
Figure 4B:
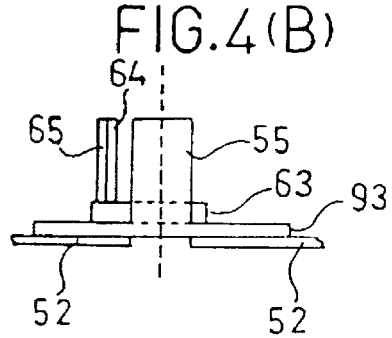
FIG. 4(B) is a cross-section view of the lever arm assembly, the toothed wheel-drum and part of the casing of the continuous video cassette tape of the second embodiment of my invention.

FIG. 4A shows a lever arm assembly which comprises a lever arm 63 and pinch rollers and 64 and 65, and shows the driving drum 55 and the teethed wheel 93. FIG. 4B shows a cross-sectioned view of a lever arm 63, the driving drum 55, the toothed wheel 93, and part of casing 52.

In accordance with the continuous audio and video cassette tape of my invention, the following advantages are obtainable.

a) The audio and video cassette of my invention provides a cassette tape which can be played in a recording apparatus continuously without stopping and rewinding.

b) Furthermore, it provides a recording time from a few seconds to a number of minutes according to different purposes.

c) A language learning student can use this continuous audio cassette tape with a few seconds of recording time to copy one phrase of a foreign language and play it back. The recording apparatus will repeat the recorded phrase continuously until the student masters the phrase. The student then can go on to the next phrase. It is much easier to learn a foreign language using this method.

d) The continuous audio or video cassette tape with a number of minutes recording time is suitable for use to give information about products in a supermarket, for listening to music to help one relax, for producing a music background in a shopping center or restaurant, for using in an answering phone machine, directing the passengers at an airport, advertising in an open place, where the people can hear the message or view the image without troubles of rewinding the tape.

e) The continuous audio cassette tape of the present invention can provide better quality and longer recording time than the conventional endless audio cassette tape, as the magnetic tape of cassette tape of my invention moves without any part of it passing across other part, while in the conventional endless audio cassette tape, the magnetic tape is pulled out from the center of the reel, feeding askew, passing across the reel. This mechanical arrangement can make the magnetic tape easily jam and damage, also it can not provide longer recording time.

f) With the continuous audio cassette tape of the present invention, the 1st and 2nd embodiments of my invention can be used either side up, while the conventional endless audio cassette tape can be used on one side only.

It will be realized that the continuous video and audio cassette tape according to my invention is not restricted to the audio cassette tape and VHS video tape shown in the examples, but may use in any other cassette tape. Obviously many modifications and variations of my invention are possible in the light of the above discussion. It is therefore to be realized that within the scope of the claims, my invention may be used in other respects than described here.

What I claim is:

1. A magnetic tape cassette for use in a magnetic tape recording and/or reproducing apparatus, the cassette comprising:

a casing for housing a magnetic tape, said magnetic tape having two ends connected together continuously forming one endless loop;

at least one hub rotatably mounted within said casing for rotationally engaging a driving shaft of said recording and/or reproducing apparatus;

at least one conveyor assembly, frictionally coupled to said hub, for imparting motion to said magnetic tape housed within said casing;

said conveyor assembly further comprising a plurality of guide rollers rotatably disposed about an outer circumference of said hub and an endless belt entrained about said plurality of guide rollers for frictionally coupling a rotation of said hub to said magnetic tape;

at least one lever arm assembly coaxially disposed about said hub and connected to said endless belt of said conveyor assembly, whereby motion of said endless belt imparts circumferential motion to said lever arm assembly;

said lever arm assembly comprising a lever arm, said lever arm including a plurality of lever arm pinch rollers rotatably disposed on a distal end of said lever arm for guiding said magnetic tape about said hub;

a plurality of stop pins mounted within said casing adjacent said hub for limiting circumferential travel of said lever arm;

wherein said hub engages said driving shaft of said recording and/or reproducing apparatus, a rotational force of said driving shaft is transmitted to said hub and said endless belt of said conveyor assembly thus imparting motion to said magnetic tape frictionally coupled thereto, said magnetic tape being coiled circumferentially about said hub by an oscillatory motion of the lever arm coupled to said endless belt such that the coiled magnetic tape remains substantially within a plane parallel to said hub.

* * * * *